(12) United States Patent
Dighe et al.

(10) Patent No.: US 9,063,730 B2
(45) Date of Patent: Jun. 23, 2015

(54) PERFORMING VARIATION-AWARE PROFILING AND DYNAMIC CORE ALLOCATION FOR A MANY-CORE PROCESSOR

(75) Inventors: Saurabh Dighe, Beaverton, OR (US);
Sriram R. Vangal, Portland, OR (US);
Nitin Y. Borkar, Portland, OR (US);
Vivek K. De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 12/972,985

(22) Filed: Dec. 20, 2010

(65) Prior Publication Data

US 2012/0159496 A1   Jun. 21, 2012

(51) Int. Cl.
*G06F 1/32*      (2006.01)
*G06F 9/48*      (2006.01)

(52) U.S. Cl.
CPC ............ *G06F 1/3206* (2013.01); *G06F 9/4893* (2013.01); *Y02B 60/144* (2013.01); *G06F 1/329* (2013.01)

(58) Field of Classification Search
None
See application file for complete search history.

(56) References Cited

U.S. PATENT DOCUMENTS

| | | | |
|---|---|---|---|
| 5,844,917 A | 12/1998 | Salem et al. | |
| 6,134,675 A | 10/2000 | Raina | |
| 7,412,353 B2 * | 8/2008 | Borkar et al. | 702/186 |
| 7,482,269 B2 | 1/2009 | Borkar et al. | |
| 7,574,321 B2 | 8/2009 | Kernahan et al. | |
| 7,774,590 B2 | 8/2010 | Borkar | |
| 2003/0005380 A1 | 1/2003 | Nguyen et al. | |
| 2003/0122245 A1 | 7/2003 | Chu et al. | |
| 2004/0006729 A1 * | 1/2004 | Pendurkar | 714/733 |
| 2004/0123201 A1 | 6/2004 | Nguyen et al. | |
| 2005/0213301 A1 | 9/2005 | Prasher | |
| 2005/0240850 A1 | 10/2005 | Ohwada et al. | |
| 2006/0015674 A1 | 1/2006 | Murotake | |
| 2006/0015862 A1 | 1/2006 | Odom et al. | |
| 2006/0114024 A1 | 6/2006 | Feng et al. | |
| 2006/0171244 A1 | 8/2006 | Ando | |
| 2006/0282692 A1 * | 12/2006 | Oh | 713/300 |
| 2007/0033425 A1 | 2/2007 | Clark | |
| 2007/0056621 A1 | 3/2007 | Baskaran | |
| 2008/0082844 A1 * | 4/2008 | Ghiasi et al. | 713/323 |
| 2008/0310099 A1 | 12/2008 | Monferrer et al. | |

(Continued)

OTHER PUBLICATIONS

Yuan et al. Energy-efficient soft real-time CPU scheduling for mobile multimedia systems. [online] (Dec. 5, 2003). ACM, pp. 1-15. Retrieved From the Internet <https://cs.uwaterloo.ca/~Brecht/courses/702/Possible-Readings/scheduling/energy-efficient-soft-real-time-scheduling-sosp-2003.pdf>.*

(Continued)

*Primary Examiner* — Emerson Puente
*Assistant Examiner* — Jonathan R Labud
(74) *Attorney, Agent, or Firm* — Trop, Pruner & Hu, P.C.

(57) ABSTRACT

In one embodiment, the present invention includes a processor with multiple cores each having a self-test circuit to determine a frequency profile and a leakage power profile of the corresponding core. In turn, a scheduler is coupled to receive the frequency profiles and the leakage power profiles and to schedule an application on at least some of the cores based on the frequency profiles and the leakage power profiles. Other embodiments are described and claimed.

18 Claims, 6 Drawing Sheets

(56) References Cited

U.S. PATENT DOCUMENTS

2009/0055826 A1* 2/2009 Bernstein et al. ............. 718/102
2011/0023047 A1* 1/2011 Memik et al. ................. 718/104

OTHER PUBLICATIONS

Qiu et al. Dynamic and Leakage Energy Minimization With Soft Real-Time Loop Scheduling and Voltage Assignment. [online] (Feb. 22, 2010). IEEE., pp. 501-504. Retrieved From the Internet <http://ieeexplore.ieee.org/xpls/abs_all.jsp?arnumber=4814494&tag=1>.*

Jejurikar et al. Leakage Aware Dynamic Voltage Scaling for Real Time Embedded Systems. [online] (Nov. 30, 2003). University of California., pp. 1-17. Retrieved From the Internet <http://citeseerx.ist.psu.edu/viewdoc/download?doi=10.1.1.4.7542&rep=rep1&type=pdf>.*

J. Donald, et al., "Techniques for Multicore Thermal Management: Classification and New Exploration," ISCA 2006, 11 pages total.

R.S. Prasher, et al., "Nano and Micro Technology-Based Next-Generation Package-Level Cooling Solutions," Intel Technology Journal, vol. 9, No. 4, Nov. 2005, pp. 285-296.

U.S. Appl. No. 12/824,945, filed Jun. 28, 2010, entitled "Resiliently Retaining State Information of a Many-Core Processor," by Shekhar Borkar, et al.

U.S. Appl. No. 12/955,022, filed Nov. 29, 2010, entitled "Microarchitecture Controller for Thin-Film Thermoelectric Cooling," by Pedro Chaparro Montferrer, et al.

* cited by examiner

PERFORMING VARIATION-AWARE PROFILING AND DYNAMIC CORE ALLOCATION FOR A MANY-CORE PROCESSOR

BACKGROUND

Technology scaling and the quest for increased energy efficiency have fueled the growth of many-core processors. However with technology scaling, core-to-core variations in maximum frequency (Fmax) and leakage power due to within-die device parameter variations have been increasing.

Many-core processors with on-die network-on-chip (NoC) interconnects are emerging as viable architectures for energy efficient high performance computing (HPC). Aggressive supply voltage scaling of these processors can result in higher energy efficiency. However this efficiency comes at the expense of performance. To compensate for this performance loss, many-core processors can parallelize workloads across more cores. Future trends for energy efficiency expect more small cores integrated on a single die, larger die sizes for increased parallel performance, and lower operating voltages for increased energy efficiency. However, these trends can lead to worsening within-die (WID) variations due to the above-described device scaling.

Current scheduling algorithms are not sophisticated enough to account for within-die variations. This results in operating all cores of a processor at the frequency of the slowest core, resulting in sub-optimal energy efficiencies.

DETAILED DESCRIPTION

Figure 1:
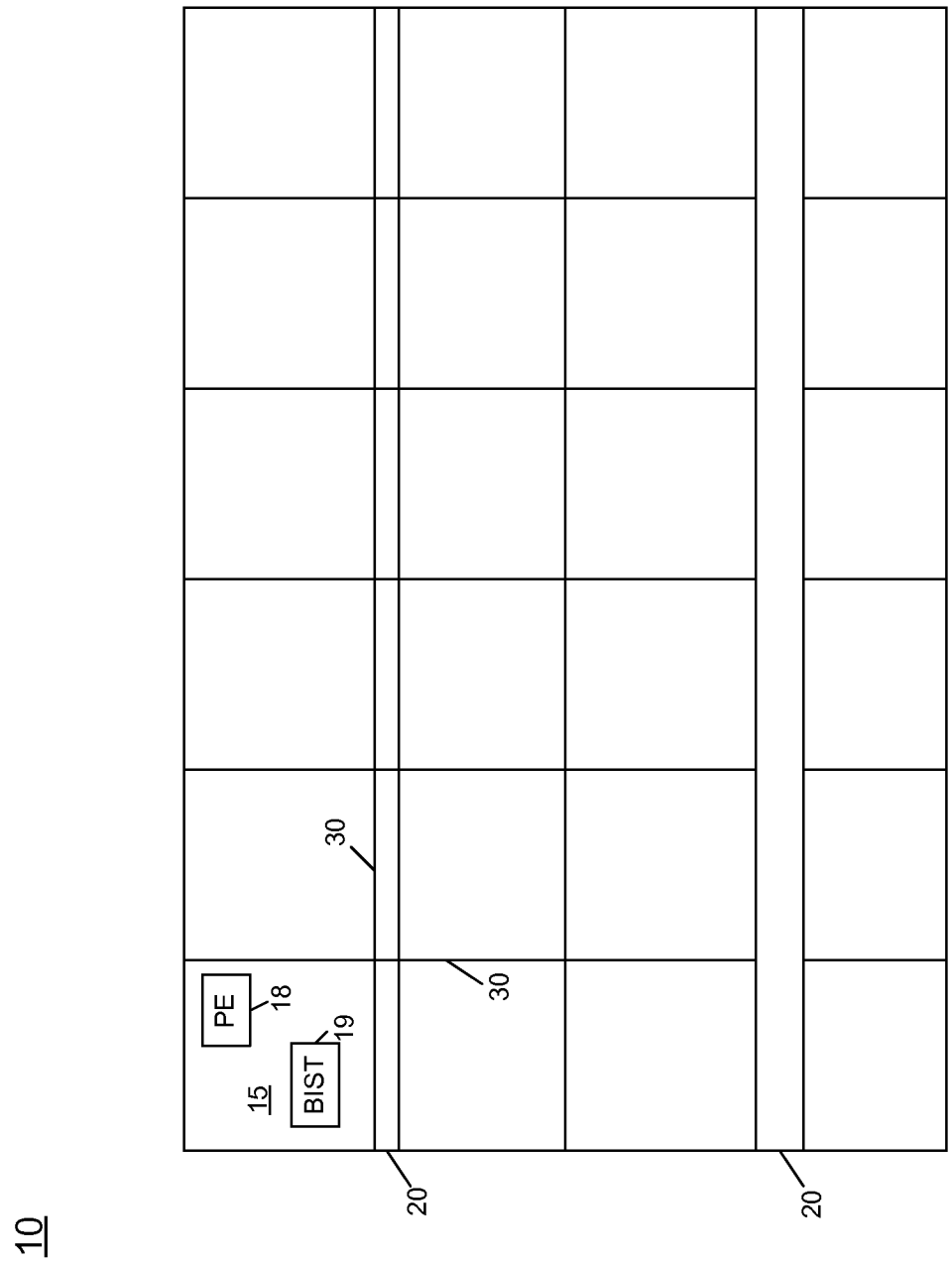
FIG. 1 is a block diagram of a processor in accordance with an embodiment of the present invention.

Embodiments may leverage within-die (WID) variations to improve performance while maintaining energy efficiency or improve energy efficiency while maintaining performance. That is, a variation-aware scheme may be used to exploit these variations for increased energy efficiency or performance. Embodiments may exploit WID variations by a combination of variation-aware software and hardware approaches. For example, a many-core processor with dynamic-voltage-frequency scaling (DVFS) can optimize power-performance of parallel workloads by varying voltage/frequency (V/F) levels of independent voltage frequency islands (VFIs) present on the die, as will be discussed further below.

In contrast to a conventional DVFS design in which all cores are treated identically and the DVFS operating points are determined by the slowest core on the chip, embodiments may implement variation-aware DVFS. While the scope of the present invention is not limited in this regard, in one embodiment a variation-aware DVFS approach may use various parameters such as per-core maximum frequency (Fmax) and leakage power profiles to map or schedule an application to an optimal set of cores.

In this approach, the first element is to perform per die profiling. More specifically for every core in a many-core processor, Fmax and leakage power profiling may be performed. In different embodiments, this profiling may be performed by running worst-case vectors on the core or with built in self test circuits or with the use of specialized test equipment during initial high volume testing to determine Fmax and leakage power. This variation data can be gathered and stored in a memory that can be accessed by a scheduler.

The second element is to perform scheduling, e.g., by software (operating system or other software code) or a hardware scheduler, with a variation-aware scheduling algorithm and a global optimizer. The algorithm and optimizer are responsible for determining the most energy efficient point for the given application while meeting the execution time target. It can be tuned for maximizing performance or energy efficiency. The optimal operating point can be defined by the number of cores that will be utilized by the application, the location of the cores on the die, and the voltage and frequency values for each utilized core. The algorithm may take into account core-to-core Fmax/leakage power variation, on-die power management schemes, execution time target, amount of computation and amount of communication between cores. Such scheduling may result in minimum energy per operation, while still meeting the execution time target. An on-die energy monitor may extract the dynamic switching capacitance (CDyn) of one or more compute block(s) and provide heuristics and voltage and frequency pairs for "optimum minimal energy" operational points.

Power management features implemented within a processor, combined with within-die core-to-core variation profiles and workload characteristics may influence the optimum settings and can be governed by balances among clock and data switching energy, inter-core communication energy and leakage power energy of active and idle cores. To this end, in some embodiments in addition to testing or characterization of the individual core's Fmax and leakage power as a function of operational voltage, other measurements may be made. For example, a measurement of switching capacitances for clock, data activity and inter-core communications (through the embedded per-core routers and on-die NoC interconnect) can be performed. Then parameterized energy and performance models may be populated by these silicon measurements.

In addition, application-specific attributes such as the number of floating point operations per second (FLOPs), switching activity, inter-core communication activity (e.g., number of flit transfers) and execution cycle penalty resulting from communication cycles that cannot be overlapped with compute cycles, can be obtained during runtime of an application. This information may then be used by the optimizer to determine the optimal V/F values and core allocation that minimizes energy per operation while meeting a target execution time. The optimizer aims to find the minima of the objective energy function under specific constraints using the Levenberg-Marquardt algorithm, in one embodiment.

Referring now to FIG. 1, shown is a block diagram of a processor in accordance with an embodiment of the present invention. In the implementation of FIG. 1, processor 10 may be a many-core processor, e.g., having a NoC architecture that contains N cores arranged as an XY 2-D mesh network. Each core 15 may include a processing engine 18 connected to, e.g., a 5-port router that is part of an interconnect fabric 30 for inter-core communication. In one embodiment, each processing engine includes two independent single-precision floating-point multiply-accumulator (FPMAC) units, instruction memory, and a data memory.

Each core 15 may be a relatively small core. In addition to processing circuitry, each core may include a built-in self test (BIST) circuit 19 to aid in performing core characterization in accordance with an embodiment of the present invention. Also in various embodiments, each core 15 may include a local memory (e.g., a cache memory) and further may be coupled to shared memory. Specifically, as shown in FIG. 1, a shared memory 20, which is a global shared memory, may be coupled to individual cores 15 via an interconnect fabric 30. Note that in some implementations, shared memory 20 may be distributed across the cores. The shared memory may be globally addressable and may be used to store the results of the characterization performed on each of the cores. For example, in one embodiment information may be stored for each core regarding Fmax (e.g., at multiple voltages), leakage power (e.g., at multiple frequencies) and so forth. While not shown in FIG. 1 for ease of illustration, it is to be understood that processor 10 may include other components, such as input/output (I/O) interfaces, buses, memory controllers, other such controllers, logic and the like.

While shown with this particular implementation in the embodiment of FIG. 1, it is to be understood that the scope of the present invention is not so limited, and in other embodiments other configurations may be present, such as one-dimensional or three-dimensional meshes or one-dimensional, two-dimensional, or three-dimensional torus configurations, for example. Further, while shown with XY individual cores in the embodiment of FIG. 1, it is to be understood that many-core processors may include more or fewer such cores in different implementations.

Figure 2:
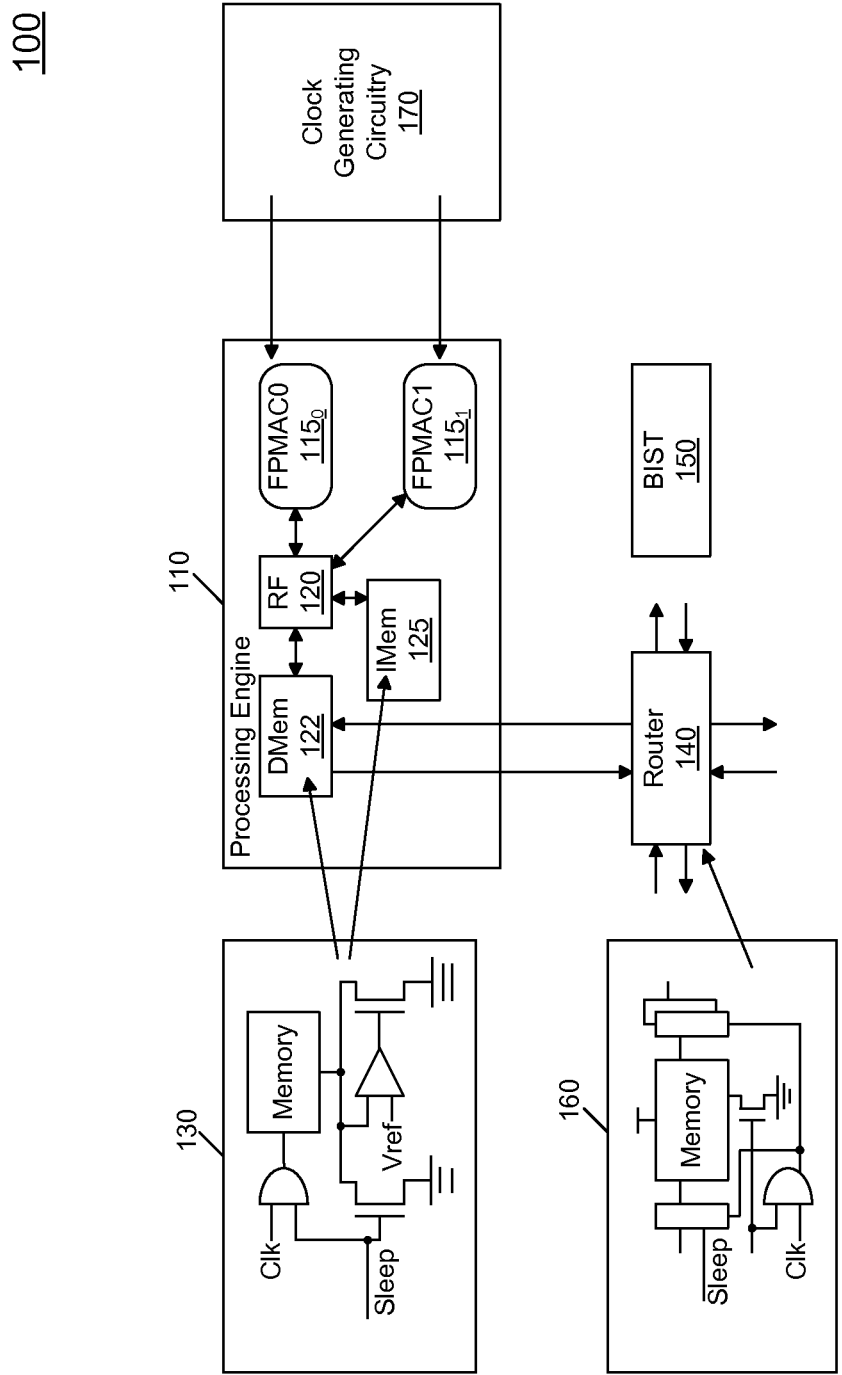
FIG. 2 is a block diagram showing further details of a core in accordance with an embodiment of the present invention.

FIG. 2 is a block diagram showing further details of a core in accordance with an embodiment of the present invention. More specifically, FIG. 2 shows a block diagram of a core or tile 100. Note that the terms "core" and "tile" may be used interchangeably to refer to both processing circuitry, memory, router and other circuitry associated with each individual processing unit within a processor. As seen, core 100 may include a processing engine 110 which, as discussed above may include multiple FPMACs $115_0$-$115_1$ which may be coupled to a register file 120 that further couples to portions of memory, including cache storages 122 and 125. In turn, additional on-core memory 130 may be present. To provide an interface to other cores of the processor, a N-way router 140 may be present. As seen, router 140 can communicate directly with processing engine 110 and a memory 160. Further present in core 110 may be a BIST circuit 150 to perform profiling in accordance with an embodiment of the present invention. Still further, clock generation circuitry 170 may be used to receive an incoming clock and distribute it as appropriate to circuitry of the core. Note that various elements of the core, including the memories and processing engine can be clock gated via clock gate circuitry present within the components and the clock generation circuitry when a sleep signal is received. While shown at a relatively high level in the embodiment of FIG. 2, understand that a core can have many additional components.

Figure 3:
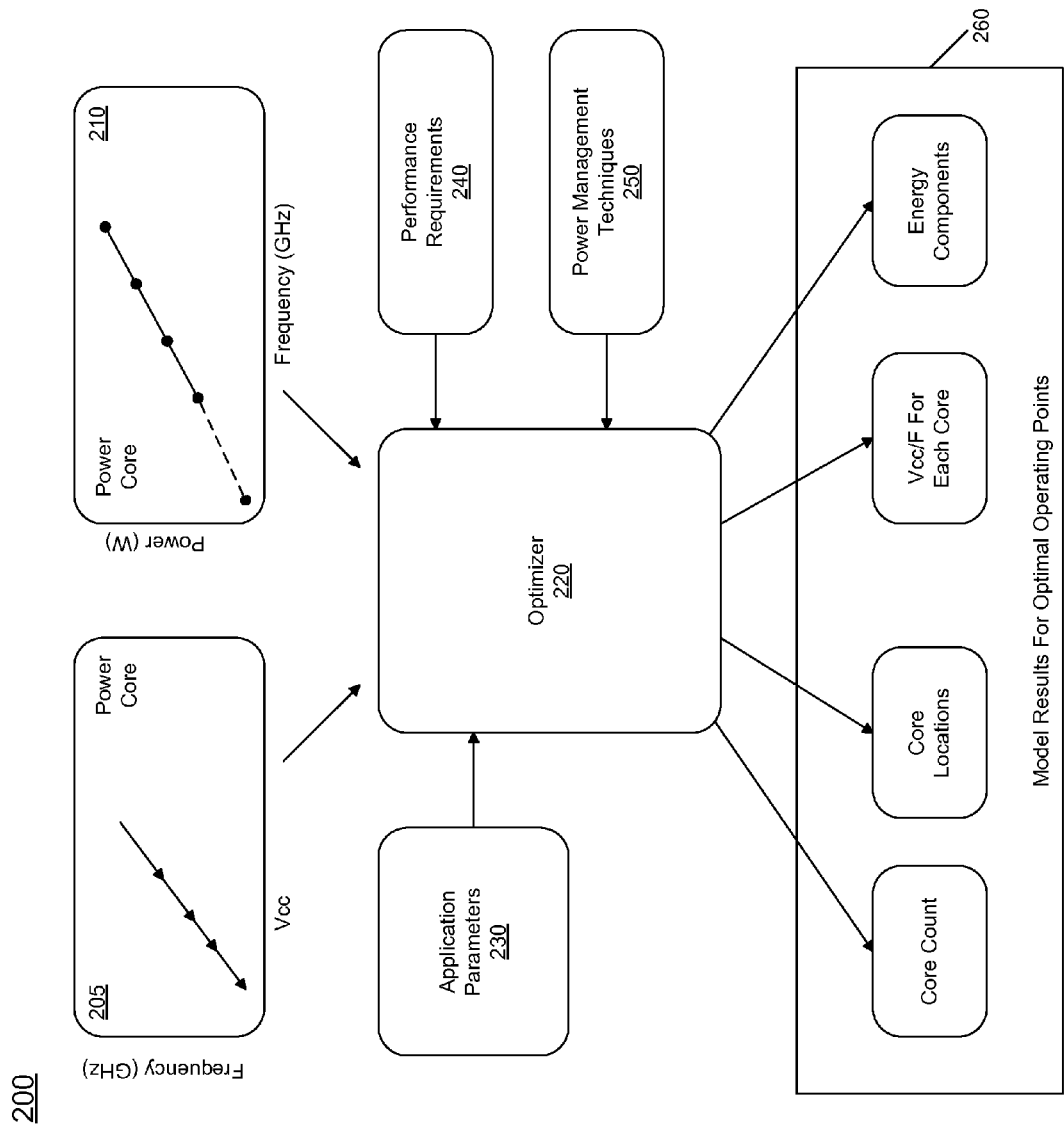
FIG. 3 is a block diagram of operation of an optimizer in accordance with an embodiment of the present invention.

Referring now to FIG. 3, shown is a block diagram of operation of a software optimizer in accordance with an embodiment of the present invention. As shown in FIG. 3, optimization unit 200 may include an energy model in accordance with one embodiment of the present invention. In various embodiments, an optimizer 220 may receive multiple inputs and based on the information received, estimate energy and generate model results for an optimal operating point for a processor.

Specifically as shown in FIG. 3, inputs to the optimizer may include profiling information. In the illustration shown, this profiling information may include per core Fmax information 205 at different voltage levels. In addition, leakage power information 210 may be provided, where the leakage power may be measured at one or more voltages and temperature. While shown with only these two profile values, additional information may include switching capacitance values for different clocks including a core clock, distribution clock data switching clock and routing clock and other units in the architecture to estimate dynamic power during runtime. A hardware energy monitor can be implemented on the chip to send real time energy information to the scheduler/optimizer.

In addition to this profiling information, optimizer 220 may further receive information regarding application parameters 230. While the scope of the present invention is not limited in this regard, such application parameters may include number of integer or floating point arithmetic operations, amount of data transferred between local memories and on the interconnect network. Although described with this particular list of parameters, understand that more or fewer application parameters may be present in different embodiments. Further inputs to optimizer 220 may include performance requirements 240, which in one embodiment may correspond to an execution time target for the application. Finally, optimizer 220 may receive power management techniques 250 that provide an indication of power management techniques activated on the processor.

Based on all of this information, optimizer 220 may perform an optimization in accordance with one embodiment of the present invention, which may be according to a Levenberg-Marquardt algorithm. An example optimizer algorithm in accordance with one embodiment is shown in Table 1.

TABLE 1 for (N = 1 to N <= 80 ) do
    for (all combinations of N tiles) do
        Create objective energy function
        $E(f_1, f_2, f_3 \ldots f_n)$ for given power management technique
        Find arg min $E(f_1, f_2, f_3 \ldots f_n)$ such that $(f_1, f_2, f_3 \ldots f_n) \in (f_{min}, f_{max})$
    end
    N ++;
end Thus as seen, execution of the algorithm will generate a solution for minimum energy under the given frequency constraints. It will solve for per core voltage and frequency value pairs and will also identify the optimal number of cores and their locations. Various information may be present within the model results. In the embodiment shown in FIG. 3, such results may include a core count corresponding to a number of cores of a processor that are to be enabled, core locations corresponding to an identity of the physical location of the to-be activated cores, corresponding voltage and frequency for each such activated core (which may be a common voltage/frequency for all enabled cores, common voltages and/or frequencies for each of multiple voltage domains, or so forth), and finally energy components, which can be used for further energy analysis to determine where most of the energy is being spent. Although shown with this particular illustration in the embodiment of FIG. 3, understand the scope of the present invention is not limited in this regard.

Figure 4:
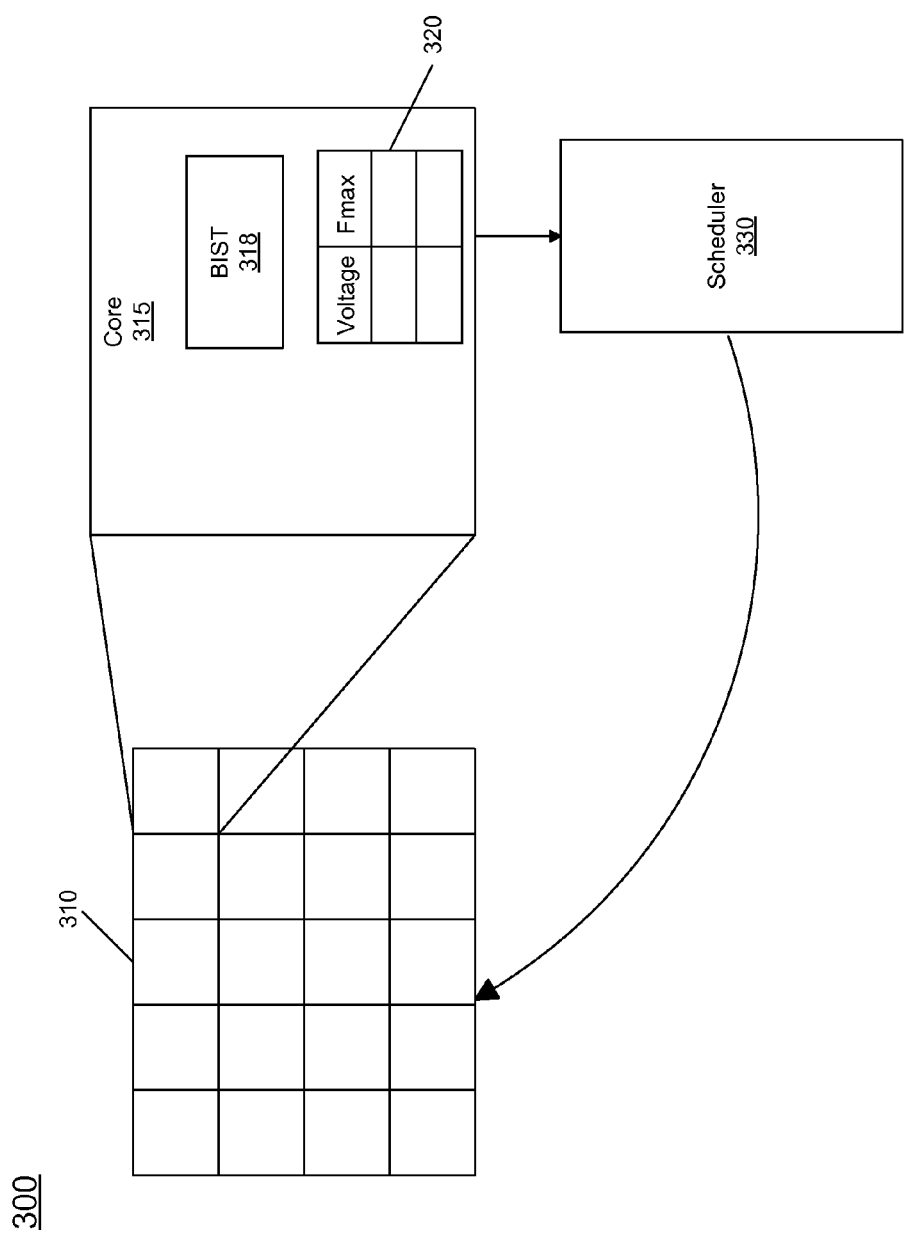
FIG. 4 is a block diagram illustrating a variation-aware scheduling operation in accordance with an embodiment of the present invention.

Referring now to FIG. 4, shown is a block diagram illustrating a variation-aware scheduling operation in accordance with an embodiment of the present invention. As shown in FIG. 4, a system 300 includes a processor 310, which may be a many-core processor as discussed above. Also illustrated in FIG. 4 are details of a given core 315. Specifically as shown, core 315 may include a BIST circuit 318 that can be used to characterize frequency at varying voltages and leakage power, for example, at varying voltage levels. In the embodiment shown in FIG. 4, core 315 is further shown to include a local portion of a globally addressable memory 320 which in one embodiment may be a static random access memory. In the illustration shown, memory 320 may include multiple entries each corresponding to a given voltage and Fmax value measured at that voltage. Of course other information may be stored in this memory including, for example, a leakage power at different frequencies, and so forth.

During scheduling operations, which may be performed by an OS or other software or hardware scheduler, a scheduler 330 may read, at least, a Fmax profile for each core. Based on this information and the additional information provided to an optimizer in accordance with an embodiment of the present invention (e.g., as discussed above regarding FIG. 3), applications may be scheduled based on an optimal core count and V/F for each such core. Accordingly, scheduler 330 may provide a series of control signals to clock/power gate unused cores or units within the core and provide a selected operating point (e.g., V/F) for the active cores. While shown with this particular implementation in the embodiment of FIG. 4, understand the scope of the present invention is not limited in this regard.

Figure 5:
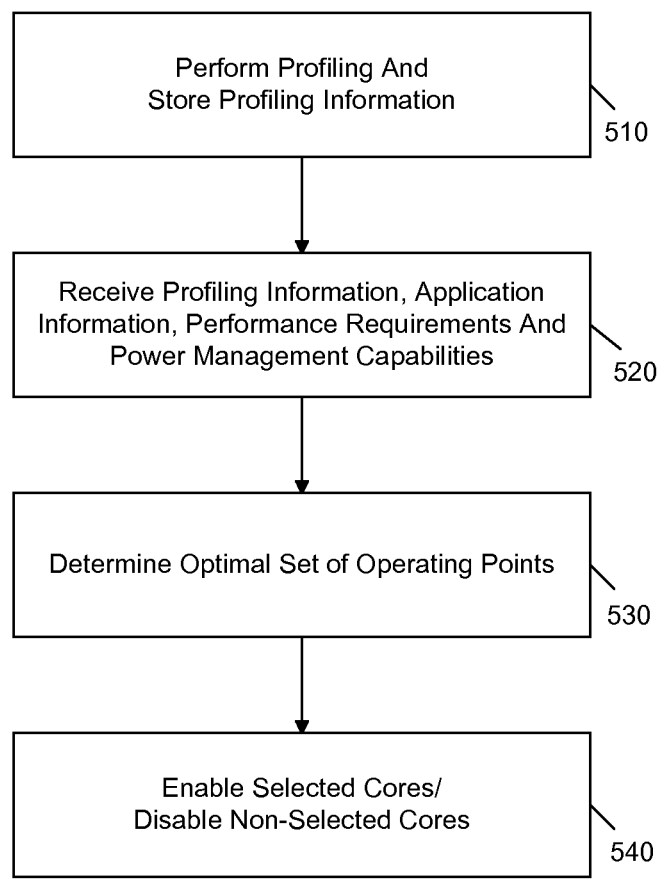
FIG. 5 is a flow diagram of a method for performing variation-aware profiling and scheduling in accordance with an embodiment of the present invention.

With reference now to FIG. 5, shown is a flow diagram of a method for performing variation-aware profiling and scheduling in accordance with an embodiment of the present invention. As shown in FIG. 5, method 500 may be implemented by a combination of hardware circuitry of the processor including circuitry present in the cores, as well as schedulers and optimizers, which may be part of an operating system, firmware or which may be implemented in hardware, in some embodiments. To begin the profiling operations, a scheduler or other controller may send a control signal to the cores to enable profiling of the cores and storage of the profiling information (block 510). While the scope of the present invention is not limited in this regard, this command to initiate profiling may occur on an initial power up the system. In some implementations, this profiling can later be updated, e.g., when a new application is to be scheduled. In some embodiments, rather than performing multiple dynamic profilings, an initial profiling may be performed and stored within a non-volatile storage that is accessible to the processor. However, understand that even in this event, the stored profile information may be updated over time, as cores can change their characteristics, e.g., due to aging, faults or other reasons.

Thus, responsive to a control signal, profiling may be performed and the information regarding profiling may be stored in a globally accessible memory. Control next passes to block 520 where various information may be received by the optimizer. This information could come from an on-die energy monitor block in hardware. For example, the profiling information may be received, along with information regarding the application, performance requirements, power management capabilities and so forth. Based on all of this information, an optimal set of operating points may be determined (block 530). As discussed above, these operating points may include a number of cores to be enabled, corresponding locations of the cores, and a given V/F for each core, among other such information. Next, control passes to block 540, where the selected cores may be enabled. For example, active power signals may be sent to each of these cores to enable operation at the selected V/F, and furthermore a scheduler may provide an appropriate workload for processing to each of the selected cores. In addition at block 540, the scheduler may disable non-selected cores. To this end, the scheduler may generate a series of gating signals, such as sleep signals which may cause various circuitry of the non-selected cores to be disabled. While described with this particular method operation in FIG. 5, understand the scope of the present invention is not so limited.

For example, in addition to basic optimization operations and characterizing as discussed above, other embodiments may include additional sensors, and profiling and characterization abilities. Furthermore, a processor may include additional power management features that can leverage the variation-aware scheduling described herein.

For example in various embodiments, the processor may include clock and leakage power management features on the chip. Fine-grained clock gating can be used to reduce active power and can be controlled at full-chip, slice, and individual core levels based on workload. Fine-grained sleep transistor and body bias circuits may be used to reduce standby leakage power. The processor may use n-channel or p-channel metal oxide semiconductor (MOS) sleep transistors to reduce frequency penalty and area overhead. Each floating point unit can implement unregulated sleep transistors with no data retention, while memory arrays may use a regulated active clamped sleep transistor circuit that ensures data retention and minimizes standby leakage power. In one embodiment, similar to processor power saving states in accordance with the Advanced Configuration and Power Interface (ACPI) standard, e.g., Rev. 3.0b (published Oct. 10, 2006), individual cores can operate in 5 power states as determined by a scheduler in accordance with an embodiment. These 5 states may be as follows: a fully active mode with both core and router active; an intermediate lower-power state with one FPMAC in sleep state; both FPMACs in sleep state; the entire core in sleep state but router active; and deep sleep state with both core and router turned off.

In addition to efficient usage of power states to improve energy/FLOP, mapping of a workload to an optimal number of cores may be performed to operate at minimum energy for the required performance. Note that increased parallelism with the addition of more cores to an application incurs synchronization overheads, and inter-core communication energy can begin to dominate the total energy consumed. Consequently an optimal value for the number of active cores for a given application can be determined. Since the total energy consumed by an application operating at the optimal operating point is a composite of clocking, data switching, communication and leakage power energies, a shift in any one component due to activation of core power states can cause a shift in the optimal operating point and a corresponding shift in V/F values. However, a power efficient on-die communication fabric can reduce the energy cost of inter-core communication and shift the optimal energy point to favor more cores.

Clock and leakage power of idle cores reduce dramatically with gating, and thus inter-core communication energy becomes more dominant, favoring usage of fewer active cores and idling of active cores at the earliest opportunity. To satisfy the execution time requirement with fewer cores, the V/F values of active cores are higher when compared to the case with no clock or power gating. A low performance target and high communication activity workload favors fewer active cores, which imply that more cores are idle. Clock and power gating on idle cores eliminates wasted clock energy and reduces the leakage power energy on these cores. Conversely, an application with low communication activity, high compute activity and, e.g., a 50% of peak performance target gains less, as it favors the use of more cores, attributable to fewer data transfers between cores and a higher performance requirement.

A single voltage multiple frequency (SVMF) processor with an adjustable single global chip-wide voltage and per-core frequency islands (FI's) can adjust the frequency of each core independently and is not limited by the slowest core on the chip. In such implementations, voltage scaling may be limited by the voltage of the slowest core in the optimal mapping that meets the performance requirement of the workload. The optimizer thus maps the application to a fast set of cores and improves efficiency by operating at higher frequencies and power gating cores that finish their jobs earlier. Conversely, a multiple voltage single frequency (MVSF) processor with an adjustable single chip-wide frequency and per-core voltage islands can adjust the voltage of each core independently and may provide energy gains of approximately 25% for the same application, in one embodiment.

Chip frequency can be determined by the performance requirement of the workload and energy savings may be obtained by scaling down voltage on faster cores to support a single chip frequency. The optimal operating point uses fewer faster cores which results in less inter-core communication energy and less leakage power energy from power gating more idle cores. Although this may cause increased clocking and data switching energies due to a higher operating frequency, an overall net benefit may be achieved.

Variation-aware dynamic thread hopping may be used for multiple instruction multiple data (MIMD) workloads in which threads with longer execution cycles migrate to faster cores (as they become available) to increase performance or energy efficiency of the workload. To speed up execution, frequencies of medium and fast core clusters may be increased while operating at the voltage determined by the frequency of the slowest cluster. Conversely, to increase energy efficiency all clusters may be operated at the frequency of the slowest cluster and voltages for the medium and fast clusters can be dialed down.

In some embodiments, one or more thermal sensors may be distributed across the die to allow direct die temperature profiling at run-time and provide opportunities for implementing temperature-aware and variation aware-MVSF processor scheduling. Optimal voltage domain partitioning, DVFS-enabled 2D-NoC and per-core clock/power gating may be implemented to best exploit the benefits of such a temperature and variation-aware processor. Some correlation is observed between WID Fmax and leakage power variations such that leakage power spread across core clusters or voltage domains is large enough that mapping workloads to low-leakage power clusters may provide significant energy savings when leakage power energy is dominant.

By using a variation-aware scheme in accordance with an embodiment, improved energy/operation for a given application may be realized with intelligent scheduling, and a minimum energy point may be realized by utilizing fewer cores. For example, in different embodiments a 19-35% improvement for a range of different performance targets and application characteristics may be achieved. In one embodiment, a scheme in which each core is running at the same frequency and the individual voltage of each core is adjusted to meet the given frequency may provide for improved energy efficiency with the least overhead.

Figure 6:
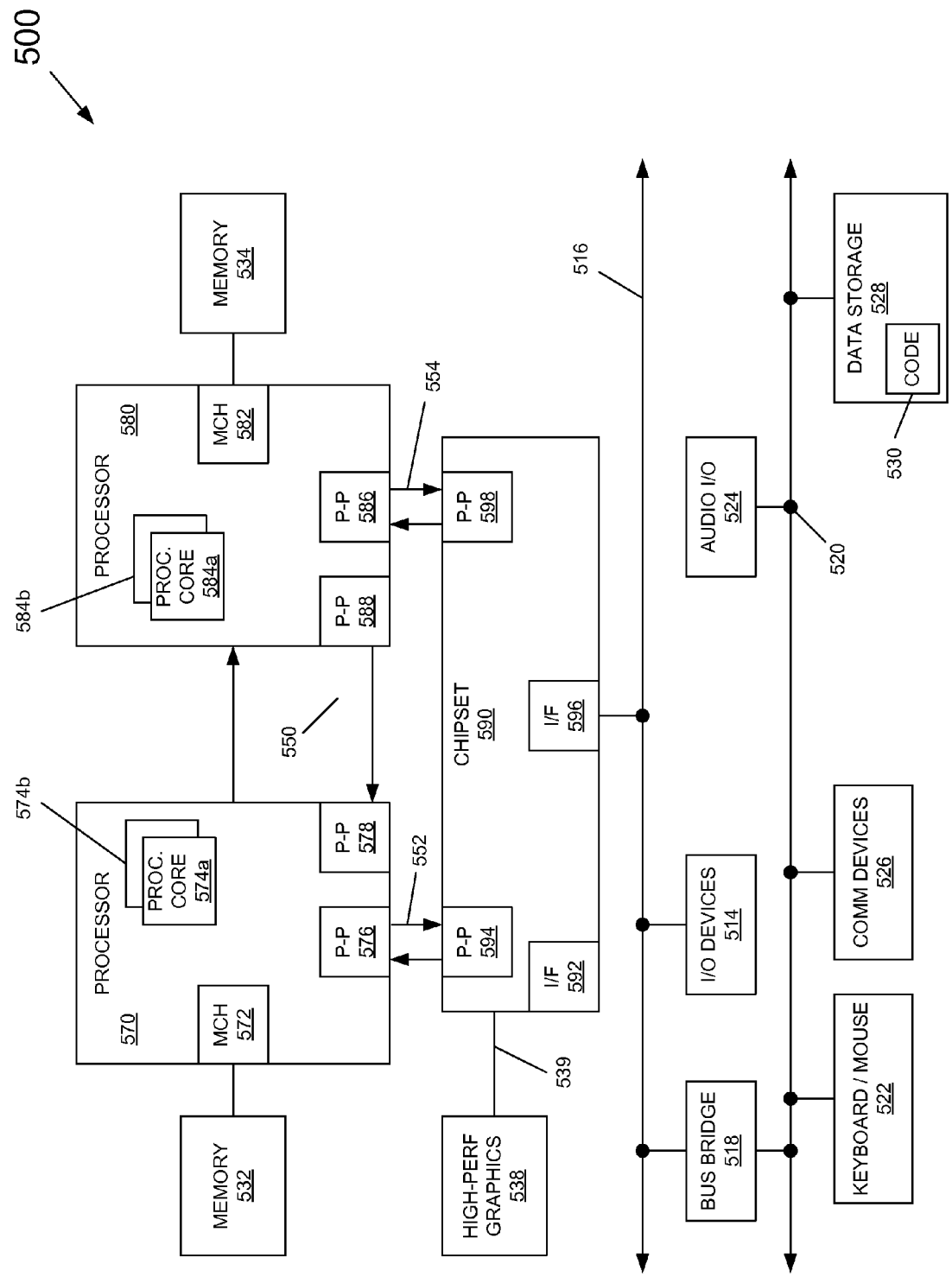
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 500 is a point-to-point interconnect system, and includes a first processor 570 and a second processor 580 coupled via a point-to-point interconnect 550. As shown in FIG. 6, each of processors 570 and 580 may be multicore processors, including first and second processor cores (i.e., processor cores 574a and 574b and processor cores 584a and 584b), and potentially many more cores may be present in the processors. The processors each may perform variation-aware scheduling based on profile information obtained and stored in on-chip storage in accordance with an embodiment of the present invention to improve energy efficiency.

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory (e.g., a dynamic random access memory (DRAM)) locally attached to the respective processors, and which collectively may maintain a directory. First processor 570 and second processor 580 may be coupled to chipset 590 via P-P interconnects 552 and 554, respectively. As shown in FIG. 6, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 6, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Note that while shown in the embodiment of FIG. 6 as a multi-package system (with each package including a multi-core processor) coupled via point-to-point interconnects, the scope of the present invention is not so limited. In other embodiments, other interconnects such as a front side bus may couple together processors in a dual or multiprocessor system. Still further, understand that embodiments may further be used in uniprocessor systems, e.g., in a system having a processor with a single core or multiple cores.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
 a plurality of cores each having a self-test circuit to determine a frequency profile and a leakage power profile of the corresponding core; and
 a scheduler to:
  receive the frequency profiles and the leakage power profiles of the plurality of cores,
  based at least in part on a dynamic switching capacitance of a compute block, the frequency profile of each core of the plurality of cores, the leakage power profile of each core of the plurality of cores, and a performance requirement of the application, determine a voltage and a frequency of each core of at least some of the plurality of cores,
  based at least in part on the dynamic switching capacitance of the compute block, the frequency profile of each core of the plurality of cores, the leakage power profile of each core of the plurality of cores, and the performance requirement of the application, schedule an application on the at least some of the plurality of cores, wherein the scheduler is to schedule the application at a minimum energy point that meets the performance requirement of the application, and
  adjust the voltage and the frequency of each core of the at least some of the plurality of cores independently.

2. The processor of claim 1, wherein the scheduler is to schedule the application further based on application parameters and power management information of the processor.

3. The processor of claim 2, wherein the performance requirement includes an execution time target.

4. The processor of claim 2, wherein the application parameters include an operations per second target, a number of data units transferred, a compute activity factor, and a communication-computation overlap factor.

5. The processor of claim 2, wherein the application parameters include inputs from an energy monitor, wherein the energy monitor is to extract the dynamic switching capacitance of the compute block and provide voltage and frequency pairs for an optimum minimal energy operational point.

6. The processor of claim 1, wherein the processor comprises a multi-core processor including a memory to store the frequency profiles and the leakage power profiles of the plurality of cores.

7. The processor of claim 6, wherein the scheduler is to schedule the application to a first set of cores based on a within-die variation between the leakage power profiles and the frequency profiles of the plurality of cores.

8. The processor of claim 7, wherein the multi-core processor is to operate at a plurality of voltages and frequencies.

9. The processor of claim 7, wherein the scheduler is to map an application to the first set of cores having a higher maximum frequency than a second set of cores, and to clock gate each of the first set of cores at a conclusion of a workload scheduled to the corresponding core.

10. The processor of claim 1, wherein the scheduler is to enable a first plurality of cores having a higher maximum frequency and to disable a second plurality of cores having a lower maximum frequency.

11. The processor of claim 10, wherein the scheduler is to enable the first plurality of cores in a first voltage domain and disable the second plurality of cores in a second voltage domain, when the first voltage domain has a lower leakage profile than the second voltage domain.

12. The processor of claim 1, wherein the processor further includes a plurality of thermal sensors and the scheduler is to schedule the application further based on temperature information from the plurality of thermal sensors.

13. A method comprising:
 receiving profile information from a plurality of cores of a many-core processor, the profile information including a frequency profile and a leakage power profile of each of the plurality of cores;
 determining a voltage and a frequency of a subset of cores of the plurality of cores based at least in part on a dynamic switching capacitance of a compute block, the received frequency profile of each core of the plurality of cores, the received leakage power profile of each core of the plurality of cores, and a performance requirement of the application;
 scheduling execution of an application on the subset of cores of the many-core processor, based at least in part on the dynamic switching capacitance of the compute block, the received frequency profile of each core of the plurality of cores, the received leakage power profile of each core of the plurality of cores, and the performance requirement of the application, wherein the application is scheduled on the subset of cores of the many-core processor at a minimum energy point that meets the performance requirement of the application;
 enabling the subset of cores and disabling remaining cores of the many-core processor; and
 adjusting the voltage and the frequency for each core of the subset of cores independently.

14. The method of claim 13, wherein the subset of cores have a higher maximum frequency than the remaining cores, and further comprising clock gating each of the subset of cores at a conclusion of a workload scheduled to the corresponding core.

15. A system comprising:
 a many-core processor including a plurality of cores and a memory to store frequency profiles and leakage power profiles for the plurality of cores, wherein the many-core processor is to:
  based at least in part on a dynamic switching capacitance of a compute block, within-die variations in the frequency profiles, within-die variations in the leakage power profiles, and a performance requirement of an application, determine a voltage and a frequency of each core of a selected number of cores of the plurality of cores,
  based at least in part on the dynamic switching capacitance of the compute block, the within-die variations in the frequency profiles, the within-die variations in the leakage power profiles, and the performance requirement of the application, schedule the application to the selected number of the plurality of cores, wherein the scheduler is to schedule the application at a minimum energy point that meets the performance requirement of the application, and
  adjust the voltage and the frequency of each core of the selected number of cores of the plurality of cores independently; and
 a dynamic random access memory (DRAM) coupled to the many-core processor.

16. The system of claim 15, wherein the selected number of the plurality of cores have a higher frequency profile than non-selected cores.

17. The system of claim 16, wherein the many-core processor is to clock gate the non-selected cores.

18. The system of claim 15, further comprising a scheduler coupled to receive the dynamic switching capacitance, the frequency profiles and the leakage power profiles of the plurality of cores, and to schedule the application further based on application parameters and power management information of the many-core processor, wherein the performance requirement includes an execution time target.

* * * * *